United States Patent
Herdrich et al.

(10) Patent No.: US 9,942,631 B2
(45) Date of Patent: Apr. 10, 2018

(54) OUT-OF-BAND PLATFORM TUNING AND CONFIGURATION

(71) Applicant: Intel Corporation, Santa Clara, CA (US)

(72) Inventors: Andrew J Herdrich, Hillsboro, OR (US); Patrick L. Connor, Beaverton, OR (US); Dinesh Kumar, Beaverton, OR (US); Alexander W Min, Portland, OR (US); Daniel J. Dahle, Wilsonville, OR (US); Kapil Sood, Portland, OR (US); Jeffrey B Shaw, Folsom, CA (US); Edwin Verplanke, Chandler, AZ (US); Scott P. Dubal, Beaverton, OR (US); James Robert Hearn, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 125 days.

(21) Appl. No.: 14/866,567

(22) Filed: Sep. 25, 2015

(65) Prior Publication Data
US 2017/0094377 A1 Mar. 30, 2017

(51) Int. Cl.
*H04Q 9/02* (2006.01)
*H04L 12/26* (2006.01)
*H04L 12/24* (2006.01)

(52) U.S. Cl.
CPC ............ *H04Q 9/02* (2013.01); *H04L 41/5009* (2013.01); *H04L 43/10* (2013.01)

(58) Field of Classification Search
None
See application file for complete search history.

(56) References Cited

U.S. PATENT DOCUMENTS 6,771,594 B1 * 8/2004 Upadrasta ......... H04L 29/06027
370/228
7,583,677 B1 * 9/2009 Ma .......................... H04L 45/00
370/235

(Continued)

OTHER PUBLICATIONS

"International Application Serial No. PCT/US2016/048478, International Search Report dated Dec. 9, 2016", 5 pgs.

(Continued)

*Primary Examiner* — Quan-Zhen Wang
*Assistant Examiner* — Chico A Foxx
(74) *Attorney, Agent, or Firm* — Schwegman Lundberg & Woessner, P.A.

(57) ABSTRACT

Devices and techniques for out-of-band platform tuning and configuration are described herein. A device can include a telemetry interface to a telemetry collection system and a network interface to network adapter hardware. The device can receive platform telemetry metrics from the telemetry collection system, and network adapter silicon hardware statistics over the network interface, to gather collected statistics. The device can apply a heuristic algorithm using the collected statistics to determine processing core workloads generated by operation of a plurality of software systems communicatively coupled to the device. The device can provide a reconfiguration message to instruct at least one software system to switch operations to a different processing core, responsive to detecting an overload state on at least one processing core, based on the processing core workloads. Other embodiments are also described.

17 Claims, 10 Drawing Sheets

(56) References Cited

U.S. PATENT DOCUMENTS

| | | | |
|---|---|---|---|
| 7,757,214 B1* | 7/2010 | Palczak | G06F 9/5083 709/223 |
| 7,788,670 B2* | 8/2010 | Bodas | G06F 9/5044 712/203 |
| 7,921,276 B2* | 4/2011 | Illikkal | G06F 12/126 711/207 |
| 7,996,839 B2* | 8/2011 | Farkas | G06F 9/5088 702/182 |
| 8,190,930 B2* | 5/2012 | Herdrich | G06F 1/3203 710/113 |
| 8,347,129 B2* | 1/2013 | Paik | G06F 1/3203 713/300 |
| 8,937,941 B1* | 1/2015 | Vendrow | H04L 67/24 370/352 |
| 9,075,952 B2* | 7/2015 | Niell | G06F 15/7807 |
| 9,100,852 B2* | 8/2015 | Xiang | H04W 28/0231 |
| 9,264,320 B1* | 2/2016 | Shevenell | H04L 47/6235 |
| 9,442,758 B1* | 9/2016 | Sakarda | B60K 7/0007 |
| 9,495,001 B2* | 11/2016 | Varma | G06F 1/3293 |
| 9,563,532 B1* | 2/2017 | Hundt | G06F 11/3409 |
| 9,753,526 B2* | 9/2017 | Ardanaz | G06F 1/325 |
| 2004/0105384 A1* | 6/2004 | Gallezot | H04L 47/10 370/229 |
| 2005/0239497 A1* | 10/2005 | Bahl | H04W 88/06 455/552.1 |
| 2006/0136929 A1* | 6/2006 | Miller | G06F 9/5083 718/105 |
| 2007/0060158 A1* | 3/2007 | Medepalli | H04W 72/085 455/450 |
| 2007/0104102 A1* | 5/2007 | Opsasnick | H04L 47/10 370/230 |
| 2007/0285417 A1* | 12/2007 | Prokopenko | G06T 15/405 345/419 |
| 2008/0133836 A1* | 6/2008 | Magid | G06F 12/0897 711/122 |
| 2008/0209188 A1* | 8/2008 | Kim | G06F 9/3842 712/234 |
| 2009/0083737 A1 | 3/2009 | Ben-yehuda et al. | |
| 2009/0138682 A1* | 5/2009 | Capps, Jr. | G06F 9/30101 712/220 |
| 2009/0172229 A1* | 7/2009 | Zmudzinski | G06F 9/4812 710/260 |
| 2010/0186010 A1* | 7/2010 | Chalemin | G06F 9/5077 718/1 |
| 2011/0066806 A1 | 3/2011 | Chhugani et al. | |
| 2011/0087843 A1* | 4/2011 | Zhao | G06F 12/0864 711/129 |
| 2011/0119373 A1* | 5/2011 | Chan | H04L 41/5009 709/224 |
| 2011/0219208 A1* | 9/2011 | Asaad | G06F 15/76 712/12 |
| 2011/0243074 A1* | 10/2011 | Shin | H04B 10/803 370/329 |
| 2011/0246995 A1* | 10/2011 | Fedorova | G06F 9/5033 718/103 |
| 2011/0258413 A1* | 10/2011 | Cho | G06F 9/5044 712/16 |
| 2011/0264938 A1* | 10/2011 | Henroid | G06F 1/3203 713/323 |
| 2012/0093035 A1* | 4/2012 | Kidambi | H04L 49/3054 370/255 |
| 2012/0095607 A1* | 4/2012 | Wells | G06F 1/3203 700/291 |
| 2012/0151044 A1 | 6/2012 | Luna et al. | |
| 2012/0159428 A1* | 6/2012 | Park | G06F 8/36 717/104 |
| 2012/0173907 A1* | 7/2012 | Moses | G06F 1/3225 713/321 |
| 2012/0233477 A1* | 9/2012 | Wu | G06F 1/3287 713/320 |
| 2013/0073875 A1* | 3/2013 | Anderson | G06F 1/3293 713/300 |
| 2013/0111121 A1* | 5/2013 | Ananthakrishnan | G06F 12/084 711/105 |
| 2013/0223218 A1* | 8/2013 | Vasseur | H04L 45/34 370/232 |
| 2013/0318334 A1* | 11/2013 | Waskiewicz, Jr. | G06F 9/3861 712/244 |
| 2014/0071223 A1* | 3/2014 | Chatterjee | H04L 65/403 348/14.08 |
| 2014/0095691 A1* | 4/2014 | Ganguli | H04L 41/5025 709/224 |
| 2014/0122801 A1* | 5/2014 | Loh | G06F 13/1663 711/118 |
| 2014/0122834 A1 | 5/2014 | Ganguli et al. | |
| 2014/0149752 A1* | 5/2014 | Brock | G06F 1/3206 713/300 |
| 2014/0181545 A1* | 6/2014 | Shrall | G06F 1/3206 713/320 |
| 2014/0223098 A1* | 8/2014 | Lee | G06F 9/5016 711/118 |
| 2014/0310462 A1* | 10/2014 | Waldspurger | G06F 12/0891 711/118 |
| 2015/0052441 A1* | 2/2015 | Degioanni | G06F 11/3495 715/734 |
| 2015/0058650 A1* | 2/2015 | Varma | G06F 1/3293 713/324 |
| 2015/0124622 A1* | 5/2015 | Kovvali | H04W 28/0215 370/236 |
| 2015/0149982 A1* | 5/2015 | Shoham | G06F 8/30 717/106 |
| 2015/0180730 A1* | 6/2015 | Felstaine | H04L 41/022 709/225 |
| 2015/0205642 A1* | 7/2015 | Xu | G06F 9/5088 718/105 |
| 2015/0235308 A1 | 8/2015 | Mick et al. | |
| 2015/0317563 A1* | 11/2015 | Baldini Soares | G06N 99/005 706/12 |
| 2015/0319041 A1* | 11/2015 | Diab | G06F 1/3206 709/221 |
| 2015/0358391 A1* | 12/2015 | Moon | H04L 67/10 709/224 |
| 2016/0021136 A1* | 1/2016 | McGloin | H04L 63/1458 726/23 |
| 2016/0043944 A1* | 2/2016 | Felstaine | H04L 43/12 370/389 |
| 2016/0094643 A1* | 3/2016 | Jain | H04L 45/44 709/226 |
| 2016/0147274 A1* | 5/2016 | Kumar | G06F 1/324 713/322 |
| 2016/0179375 A1* | 6/2016 | Kirvan | G06F 3/0685 711/153 |
| 2016/0182345 A1* | 6/2016 | Herdrich | H04L 43/50 709/224 |
| 2016/0239065 A1* | 8/2016 | Lee | G06F 1/324 |
| 2016/0342447 A1* | 11/2016 | Richter | G06F 9/5088 |
| 2017/0003725 A1* | 1/2017 | Rosenzweig | G06F 1/26 |
| 2017/0118662 A1* | 4/2017 | Rahman | H04W 24/02 |

OTHER PUBLICATIONS

"International Application Serial No. PCT/US2016/048478, Written Opinion dated Dec. 9, 2016", 10 pgs.

* cited by examiner

OUT-OF-BAND PLATFORM TUNING AND CONFIGURATION

TECHNICAL FIELD

Embodiments described generally herein relate to management of resources in operator networks. Some embodiments relate to dynamic allocation of networking resources and tuning and monitoring of resource allocation.

BACKGROUND

Current cloud datacenters have been experiencing a large scale-up and scale-out for I/O devices, and this is causing new challenges for datacenter manageability, reliability and performance. Telemetry can assist datacenter software with workload placement and mapping, but providing this telemetry can place a further drain on datacenter resources.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
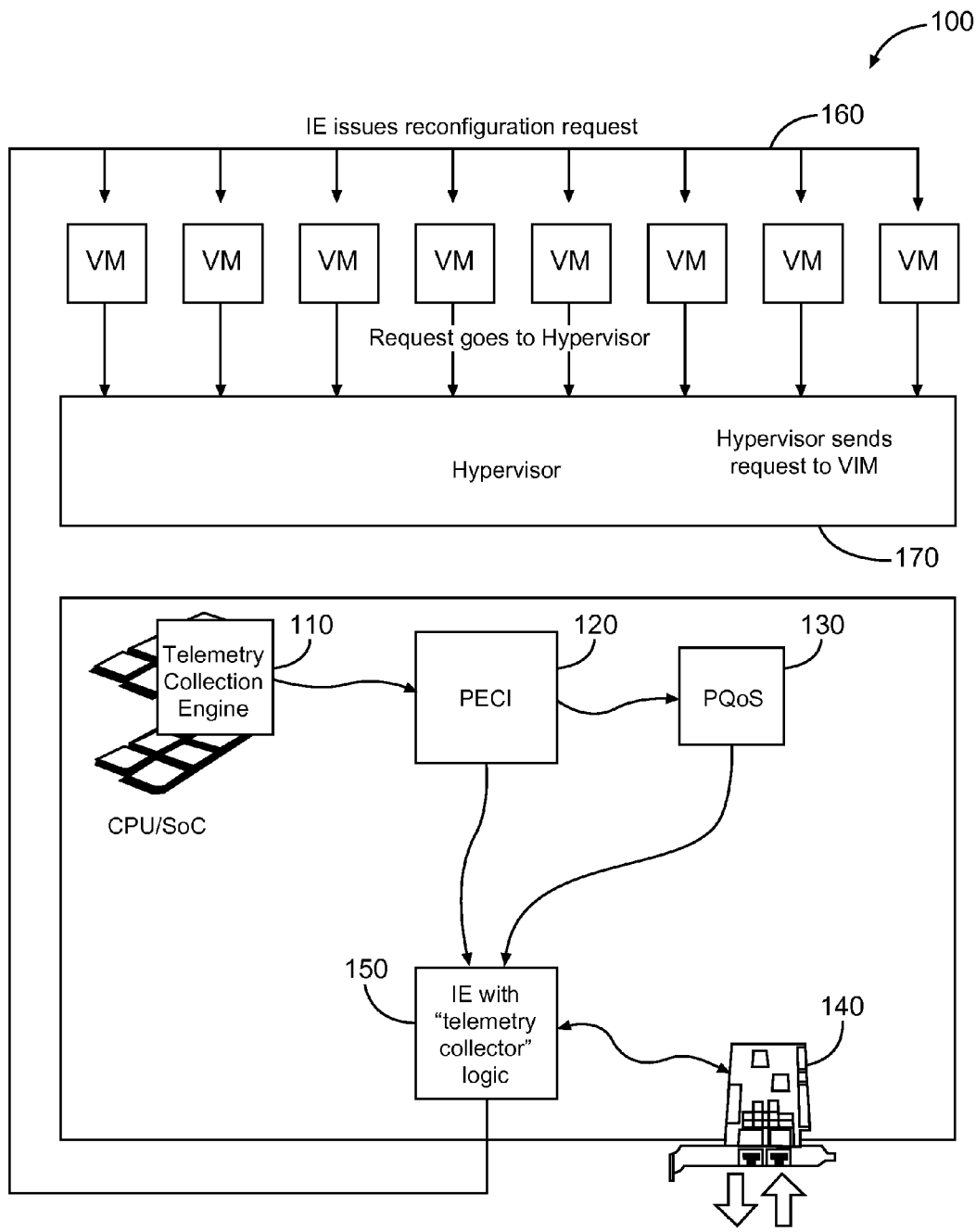
FIG. 1 illustrates components of a platform for providing out-of-band telemetry in accordance with some embodiments.

Recently, datacenter operators have experienced challenges in providing large-scale manageability, reliability and performance for I/O devices, such as Ethernet 10/40/100 Gbps/++ devices, Infiniband devices, RSA Optical fabric/ interconnects, switches, etc. Additionally, as operators scale up/out, guaranteeing the performance of individual network flows or types of traffic becomes ever more difficult, particularly in network cloud implementations such as European Telecommunications Standards Institute (ETSI) Network Functions Virtualisation (NFV) and software defined network (SDN) Cloud. Still further, network operators and service providers demand high levels of resiliency with network cloud systems. To complicate the situation even more, the range in features, capabilities and performance between deployed server systems increases and heterogeneity increases as customers add newer machines to their deployed fleets without necessarily retiring older machines.

I/O scale out/up can be achieved and better managed overall in cloud datacenters through mechanisms that rely on reliable and continuous delivery of telemetry from the platform I/O devices (e.g. network interface cards (NICs), switches, etc.) to external automatic orchestration logic, for a more flexible and software-defined infrastructure. However, providing such telemetry can place a further drag on operator systems, such that it becomes ever more difficult to comply with service level agreements (SLAs).

Embodiments provide an orchestration controller that processes continuous streams of telemetry, both actively and passively, to manage network-centric workloads by assigning workloads to specific platforms, and migrating between platforms, as overload conditions or other adverse conditions are detected. By maintaining context and assisting with workload placement and mapping to specific platforms in accordance with various embodiments, operators can spend fewer resources, both in terms of time and instrumentation, directly managing workload placement on complex heterogeneous fleets of servers. Embodiments therefore provide solutions for issues associated with large-scale scale up/out management of reliability and performance. Embodiments can also provide benefits to compute-centric platforms.

Additionally, methods and systems in accordance with various embodiments provide for improved synchronization and accurate telemetry across servers within racks, across the datacenter, and across multiple datacenters spanning multiple geographical locations. Such synchronization is an issue in datacenter operations where it is important that the user always observes the latest copies of data.

Synchronization issues apply to not just time but configuration state as well. Configuration state can include many different parameters including power management aggressiveness, system feature state (e.g., reliability, availability and serviceability (RAS) feature dynamic configuration), and shared resource monitoring/allocation configuration for Intel® Resource Director Technology (RDT), or Platform QoS or PQoS). Any or all of these technologies can enable monitoring and control over shared platform resources such as last-level cache space, memory bandwidth, and in the future I/O bandwidth.

Some datacenter operators maintain time and configuration state synchronization using an in-band approach, where involvement from the operating system (OS) or virtual machine manager (VMM) running on the system is provided to accept and apply updated parameters such as a time value or a configuration setting. This involvement from the OS or VMM introduces overhead and latency by interrupting the normal operation of the OS/VMM and consuming compute cycles. By offloading these tasks to out-of-band (OOB) systems in accordance with various embodiments, collection, aggregation and analysis of data can be performed without the use of Intel® Architecture (IA) cores or other cores implementing an OS or VMM.

Although some embodiments use the Intel® Management Engine (ME) or Innovation Engine (IE), other instantiations are possible in various other embodiments that use other combinations of OOB-capable microcontrollers and firmware that is capable of receiving parameters from an external source and applying them to update the current system configuration.

While it is possible to perform OOB management and synchronization tasks using the ME and supporting software, open sample code for the IE can also be provided to datacenter operators to accomplish the OOB platform tuning and optimization, allowing tuning parameters and even tuning algorithms to be modified by datacenter operators in accordance with their needs.

Platform Telemetry Driven Network Function Deployments for Operator Networks As briefly mentioned earlier herein, I/O scale out/up can be achieved in cloud datacenters through mechanisms that rely on reliable and continuous delivery of telemetry from the platform I/O devices (e.g. network interface cards (NICs), switches, etc.) to an external automatic orchestration logic. However, providing such telemetry can place a further drag on operator systems, such that it becomes ever more difficult to comply with service level agreements (SLAs).

Embodiments address these and other concerns by providing delivery of SLA services, fault management, alarms, and high availability on Cloud systems. The telemetry in accordance with various embodiments follows a tenant enforced secure reception and delivery of telemetry using, by way of nonlimiting example, Intel® Software Guard Extensions (SGX), Trusted Platform Module (TPM), or a secure Trusted Execution Environment (TEE). Ongoing industry efforts at Open Platform for NFV (OPNFV) and ETSI NFV are directed to defining formal requirements for these usages.

Embodiments provide the capability for Intel® IE, the OOB Core, Intel® ME, or other deployments, platforms and software to reconfigure or access physical or virtual NICs. Embodiments provide OOB or side channel access to the NICs without disrupting in-band accesses from the Intel Architecture® (IA) cores running the NIC drivers.

In contrast to some telemetry-provisioning systems, a telemetry agent in accordance with various embodiments collects data from NICs, in addition to other data described herein. Embodiments provide service quality metrics in accordance with provisioning of SLA requirements, as specified by the ETSI NFV standards group, which specifies the need for detailed NIC, I/O and platform telemetry. Messaging, OOB telemetry, metrics and periodicity described in accordance with various embodiments may be used for meeting Operator ETSI NFV requirements on IA-based NFV platforms such as Open-Source OPNFV and Sunrise Trail platforms. Some categories of this telemetry can include virtual machine (VM) operations or virtual network function (VNF) operations (e.g., latency, VM Clock error, VM Dead on Arrival, etc.), virtual network operations (e.g., packet delays, delay variations, network outages, port status, policy integrity, etc.). The telemetry agent of various embodiments processes data from processor cores, chipset, memory, the platform, NICs, storage, virtual switches (vSwitches), acceleration units (e.g., encryption, compression, etc.).

Devices in accordance with various embodiments can calculate or generate SLA metrics. For example, some devices will check that SLA is within acceptable limits, or enforce SLA violations by reporting violations to an orchestrator or other operator. Devices can also provide audit capabilities, which in the context of OOB removes the need to notify application software of adverse conditions, SLA violations, changes, etc.

The OOB approach of various embodiments can enhance or improve performance debugging, because the OOB approach does not add introspection overhead to a system already running near peak capacity. Accordingly, embodiments can avoid skewing of the performance results. OOB or side channel access to the NICs, in accordance with various embodiments, avoids disrupting in-band accesses from the IA cores running the NIC driver. Accordingly, embodiments can reduce overheads and interrupt rates for reconfiguration.

Available Ethernet I/O exposes only a limited set of telemetry, and embodiments specify additional telemetry exposed by I/O adapters (including virtual I/O adapters like vSwitch), which can be accessible by out of band techniques in accordance with various embodiments.

In some network-workload centric operator deployments, the I/O device is directly assigned to the network-centric workloads (often referred to as Virtual Network Function—VNF), and has little or no intervention from the hypervisor/VMM. In such deployments, CPU cores or threads are assigned to these VNFs and cannot be used for telemetry and orchestration, because latency requirements of the VMs are sufficiently stringent that VM traffic cannot be paused. Accordingly, the OOB mechanism of various embodiments may be desirable because such OOB mechanisms can run concurrently and asynchronously with the VMs while not occupying or contending for platform resources that the VMs are depending on to meet their latency/bandwidth targets. In addition, the mechanisms may be able to enforce SLA by, for example, administering ports (aggregation, disaggregation) and allowing/restricting traffic to match established SLAs.

In another embodiment, multiple VNFs may be running on the platform and each may be assigned to one or more physical or virtual I/O devices. The OOB mechanism thus becomes a comprehensive mechanism for telemetry and orchestration across all workloads and across all devices on the platform.

FIG. 1 illustrates components of a platform 100 for providing OOB telemetry in accordance with some embodiments. The platform 100 includes a Telemetry Collection Engine 110 that collects information from CPU/SoC. The Telemetry Collection Engine 110 can be located in the platform controller (PCH) in the south complex which runs separately which from a socket perspective from other applications, although embodiments are not limited to implementation in the PCH.

A Platform Environment Control Interface (PECI) 120 passes on CPU telemetry to device 150 for reconciliation. The device 150 can include or be included in Intel® IE although embodiments are not limited thereto. PECI is a protocol for collecting the data described herein, although embodiments are not limited to use of PECI.

PQoS 130 collects QoS information and sends the QoS information to the device 150 for reconciliation. QoS information may include (but is not limited to) cache usage metrics, memory bandwidth metrics, IO metrics, etc.

Network adapter silicon hardware 140 collects or includes statistics counters, health status, faults, traffic patterns, port status, etc., and sends this or other information to the device 150.

The device 150 includes telemetry collector logic and applies heuristics to the collected telemetry data and statistics. The device 150 therefore serves as the local platform detection and enforcement point of SLA, fault management and high availability mediation. Heuristics described with respect to various embodiments can be related to filtering. For example, telemetry can be filtered to focus on a particular VM to make decisions about operation of that particular VM.

The device 150 may recalculate an improved or optimal configuration and sends a reconfiguration command to all or some of the VMs 160. The device 150 or other system may notify a hypervisor 170 that a reconfiguration has occurred. The reconfiguration can include a re-balance. For example, the PQoS 130 may collect QoS data so that the device 150 can go back to the IA cores to notify the IA cores that a particular VM 160 is using too many resources, so that VM 160 can be assigned to run on a different core.

Embodiments can provide sleep states and statistics gatherings regarding NICs. It will be appreciated that each port on a NIC has up to 1000 queues that can be associated with a processing element, and the queues can be associated with an application. If one or more of the queues are running low on packets, decisions can be made such as putting the corresponding NIC or a group of NICs to sleep for a certain amount of time until the queues fill up, after which one more NICs will be woken up to continue processing. Embodiments remove the burden of getting such NIC statistics from an IA core.

Analysis can also be time-oriented such that operators can examine workloads and configurations for optimizations over time. A central controller, for example at a data center level, can perform such filtering and time-based analysis to detect errors and unusual trends.

FIG. 1 depicts, therefore, a number of platform elements as well as a closed loop system for monitoring hardware and software metrics and making decisions and reconfigurations each of the VMs 160 to reach an improved or optimal platform 100 state.

Figure 2:
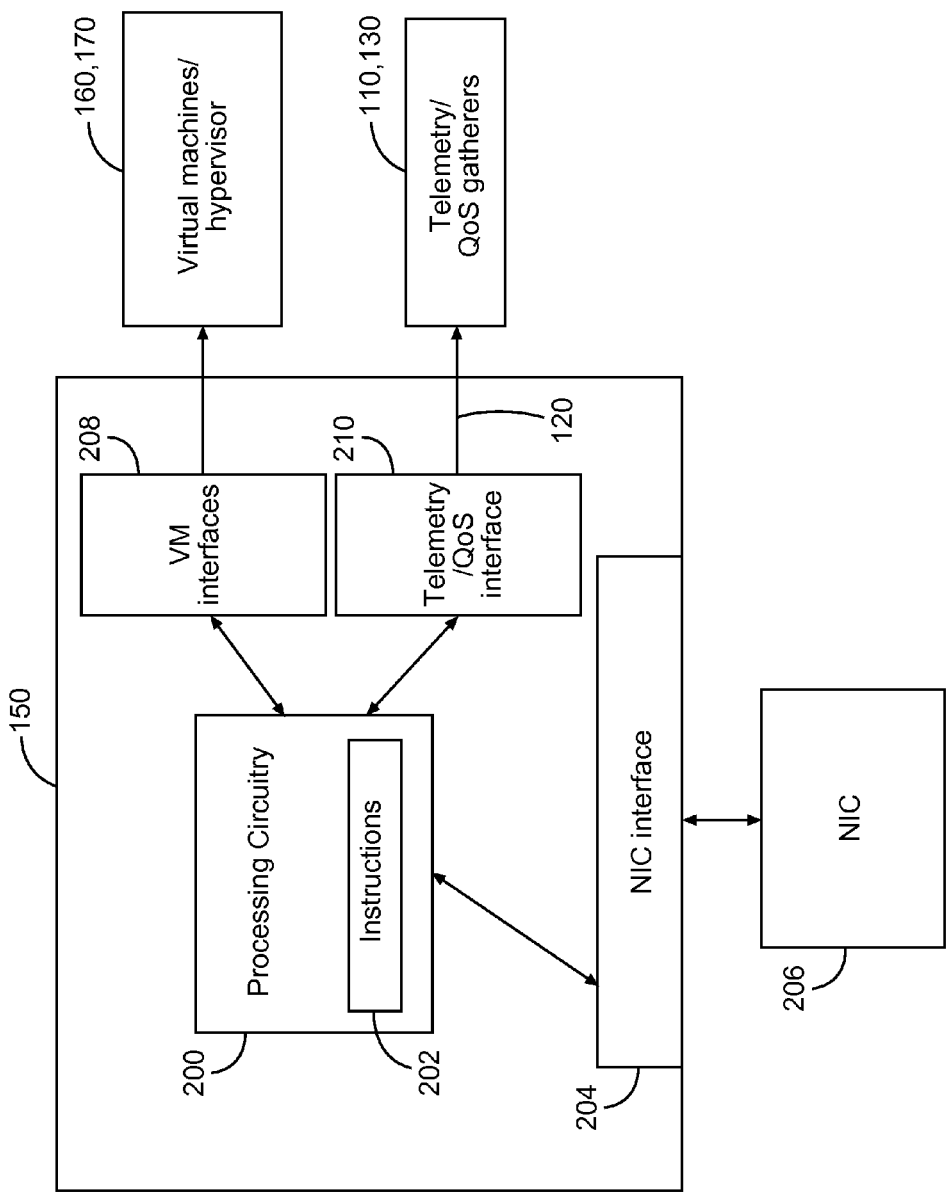
FIG. 2 illustrates a device including telemetry collection logic for providing out-of-band telemetry in accordance with some embodiments.

FIG. 2 illustrates the device 150 including telemetry collection logic for providing out-of-band telemetry in accordance with some embodiments.

The device 150 includes at least one telemetry interface 210 to a telemetry collection system. For example, the at least one telemetry interface 210 can interface with the Telemetry Collection Engine 110 for collecting statistics as described earlier herein. The at least one telemetry interface 210 can implement PECI 120 or another protocol. The device 150 can further include at least one platform interface (also incorporated in element 210) to a platform metrics collection system. As described earlier herein, the processing circuitry can gather PQoS metrics over the at least one platform interface 210, and use the PQoS metrics as inputs to the heuristic algorithm. The processing circuitry 200 can determine, based on the heuristic algorithm, whether SLA criteria have been met, and report SLA violations to datacenter management software if SLA criteria have not been met according to decisions or algorithms described earlier herein. The device 150 can include at least one network interface 204 to network adapter hardware 206.

The device 150 includes processing circuitry 200 configured to receive platform telemetry metrics from the telemetry collection system and network adapter silicon hardware statistics over the at least one network interface 204, to gather collected statistics. In embodiments, the platform telemetry metrics include metrics of at least two metric types selected from a group including processing core data, chipset data, memory element performance data, data received from an encryption unit, data received from a compression unit, storage data, virtual switch (vSwitch) data, and data received over a network interface card (NIC) connection. However, any metrics described earlier herein, or specified by ETSI NFV or other networking standard or datacenter standard, can be provided to or used by the processing circuitry 200.

The processing circuitry 200 can apply a heuristic algorithm as described earlier herein using the collected statistics to determine processing core workloads generated by operation of a plurality of VMs 160 communicatively coupled to the device 150.

The processing circuitry 200 can provide a reconfiguration message as described earlier herein to instruct at least one VM 160 to switch operations to a different processing core, responsive to detecting an overload state on at least one processing core, based on the processing core workloads. In some embodiments, the processing circuitry 200 is configured to provide the reconfiguration message within a request to a hypervisor 170.

Figure 3:
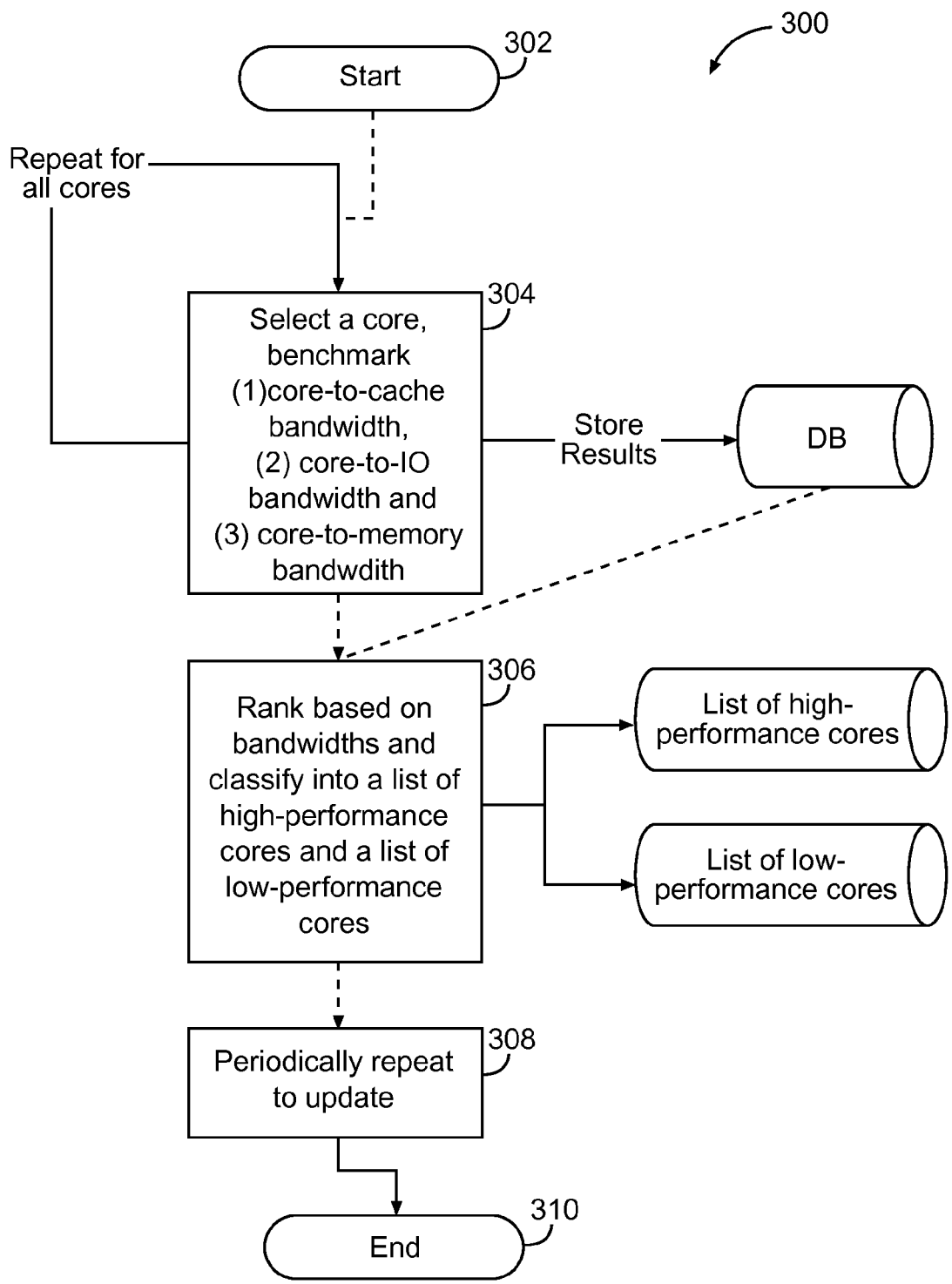
FIG. 3 is a flow diagram of an initializing and benchmarking phase of a network interface card (NIC) affinization algorithm in accordance with some embodiments.
Figure 4:
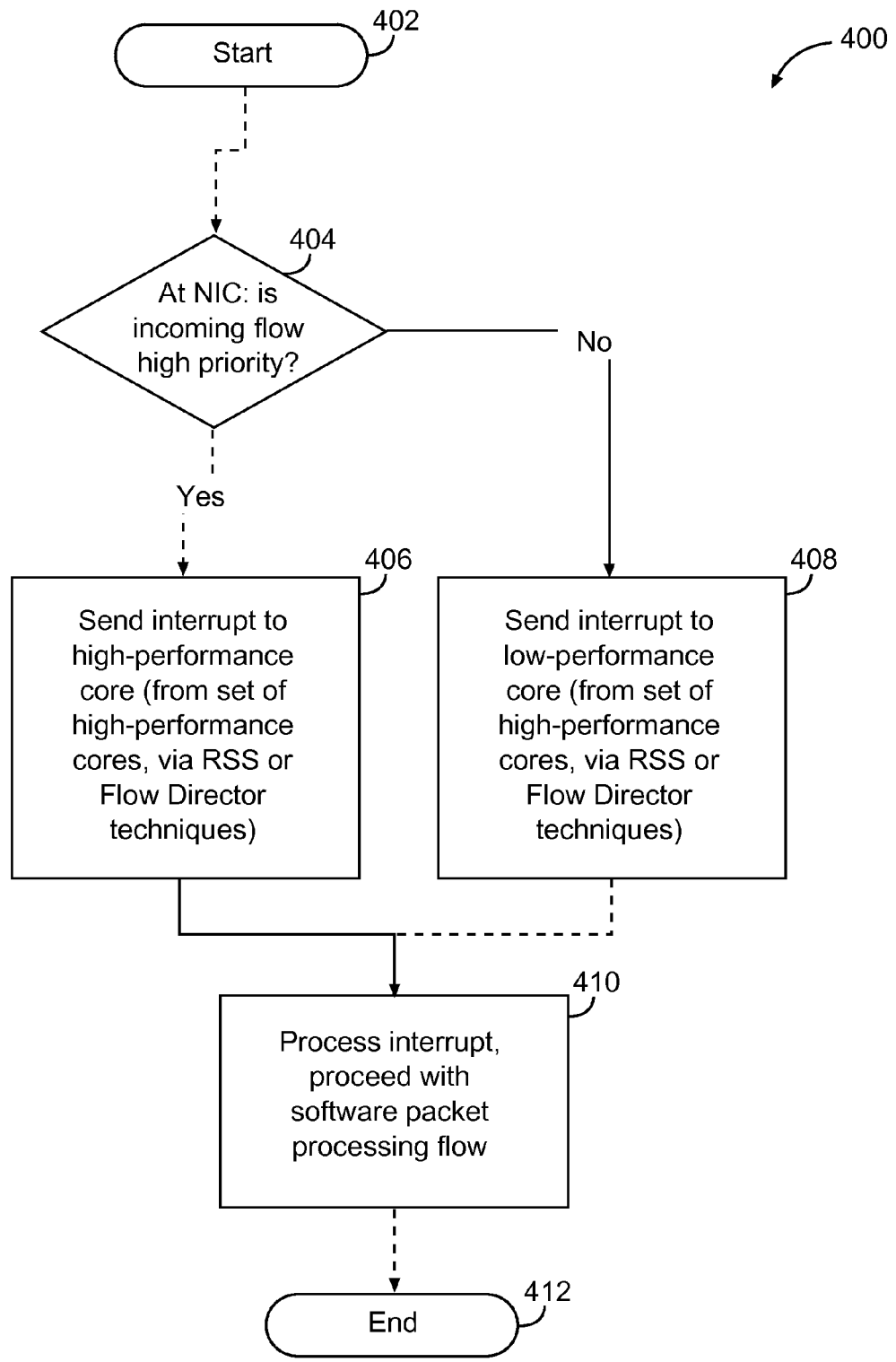
FIG. 4 is a flow diagram of an operational phase of a NIC affinization algorithm in accordance with some embodiments.

FIG. 3 is a flow diagram of an initializing and benchmarking phase 300 of a NIC affinization algorithm in accordance with some embodiments. FIG. 4 is a flow diagram of an operational phase 400 of a NIC affinization algorithm in accordance with some embodiments. The processing circuitry 200 (FIG. 2) can perform any or all of the operations shown in FIGS. 3 and 4, although other elements of the platform 100 (FIG. 1) can also execute some or all of these operations. In some embodiments, the device 150 or the processing circuitry 200 can instruct other elements of the platform 100 in performing any or all operations described with reference to FIGS. 3 and 4.

Referring to FIG. 3, in operation 304, the processing circuitry 200 can select a core (e.g., IA core) and a type of benchmarking operation to execute. The benchmarking operations can include benchmarking or other evaluations of core-to-cache bandwidth, core-to-I/O bandwidth, core-to-memory bandwidth, or other benchmarks of interest in determining NIC configurations, VM configurations, etc. To perform benchmarking, the processing circuitry 200 will instruct a set of at least two processing cores (e.g., processing cores to be benchmarked), in sequence, to enter an offline state. The processing circuitry 200 will provide instructions for performing tests on each of the set of at least two processing cores after a respective one of the set of at least two processing cores has entered the offline state. In operation 306, the processing circuitry 200 will rank the set of at least two processing cores based on performance during the benchmarking operations. Subsequent to performing tests, the processing circuitry 200 will generate a ranked set of processing cores. Results of the rankings and tests can be stored in a database or other storage, at a remote or local datacenter central location or other location, or locally to the device 150, or some combination thereof. The method 300 terminates with operation 310, but can be repeated at any time in operation 308.

Referring to FIG. 4, at operation 402, traffic can be received at a NIC of the platform 100. At operation 404, if an incoming flow is high-priority, associated NIC interrupts can be steered to a high-performance core at operation 406 (as determined based on the rankings generated and stored as described earlier herein). Otherwise, if the incoming flow is not high-priority, associated NIC interrupts can be sent to low-performance cores.

Embodiments implementing methods 300 and 400 or other similar methods can provide for dynamic detect non-uniformity in shared platform resources (for instance, in some platform embodiments certain cores may have higher available memory bandwidth, and others may have higher I/O bandwidth). The NIC driver could them be affinitized to the highest-performance core(s) and/or highest memory/cache/IO bandwidth core(s) to enhance or improve performance. By determining which cores are best suited to run the NIC drivers for certain hardware devices, embodiments provide better scale-up (within a node), better consolidation and workload density, and potentially improved system-level or workload-level metrics such as higher throughput, reduced jitter or reduced latency.

The processing circuitry 200 can also be used for performing other functionalities described below with respect to FIGS. 5-10.

Figure 5:
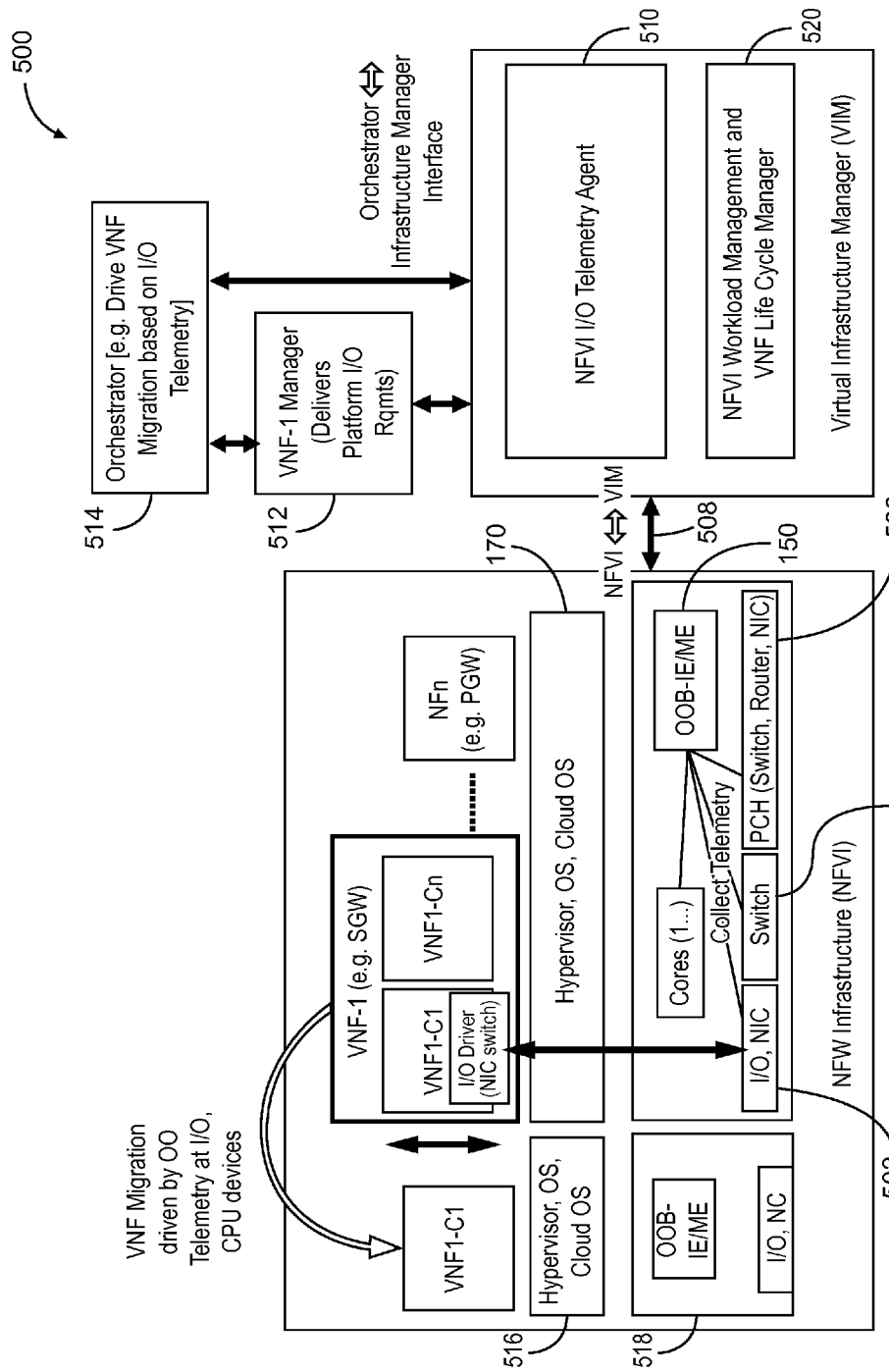
FIG. 5 illustrates a network function virtualization (NFV) system architecture and data flows in accordance with some embodiments.

FIG. 5 illustrates NFV system architecture 500 and data flows in accordance with some embodiments. As shown in FIG. 5, the device 150 collects I/O 502, switch 504, and virtual/physical functions 506 telemetry securely. Telemetry is delivered via an OOB network 508 to a NFV Cloud OS agent (e.g., a telemetry agent such as Ceilometer) 510. The telemetry is delivered to the VNF Manager (e.g., Management Console system for Cisco PDN Gateway or Juniper IDS/IPS) 512, which determines the health of the underlying NFV infrastructure (NFVI) according to the requirements of that VNF (e.g. Cisco PDN Gateway or Juniper IDS/IPS).

If the NFVI telemetry is deemed problematic (e.g., if there are too many errors, dropped packets, network-based threat in progress, denial of service (DoS) attacks, per-flow/per-tenant/temporal traffic variances, etc.) or if the VNF infrastructure (VNFI) is not meeting the ETSI NFV defined Service Quality metrics defined in accordance with a standard of the ETSI NFV family of standards or a similar standard, then such a situation may be reported to, for example, an orchestrator 514 or other system.

In addition to telemetry, the device 150 will also enable audits, alarms and controls, as mechanisms for providing SLAs and legal proof of adherence to established SLAs. The device 150 (e.g., an OOB Intel® IE or ME) will deliver the various Service Quality Metrics requirements, including faults, failures, alarms, and operational misconfigurations, etc., defined by the operators in this spec, to the hypervisor 170, OS, or Cloud OS. Service Quality Metrics include, but not limited to: first-in-first-out (FIFO) depth, flow control events, missed packet count, host buffer or descriptor utilization, Transmission Control Protocol (TCP) congestion window changes, inline Internet Protocol Security (IPsec) or Secure Sockets Layer (SSL) processing metrics and security policies such as checking traffic patterns with the security policy, key lifetime checks, OOB key management, etc. Metrics can also include performance to SLAs, bandwidth, latency, jitter, etc. Metrics can include platform-level metrics such as current cache occupancy, memory bandwidth use, I/O use, etc., by each VM, application, or thread.

Multiple instantiations 516, 518 of any of the above systems can provide or receive data flows, as shown in FIG. 5. Embodiments are not limited to the exact components or number of components shown in FIG. 5.

In embodiments, an NFV Manager can be incorporated in the Orchestrator 514 and can take remediation action on the received telemetry (service quality metrics), if the VNF or NFVI are not performing as desired by service quality. In such cases, the VNF Manager 512 can communicate with the Orchestrator 514 for remedial action. The Orchestrator 514 can direct the VIM Workload VNF Life Cycle Management Agent (e.g., enhanced OpenStack Nova) 520 to find an appropriate platform for the VNF. The VNF Life Cycle Management Agent 520 can perform a remedial action (e.g. VNF Live Migration from existing platform P1 to a new Platform P2, which can meet the expectations of the VNF and VNF manager. The selection of the new platform P2 can be performed by the VNF Life Cycle Management Agent 520 based on the received set of parameters from the VNF Manager 512 (e.g., VNF Descriptor) and the available resources on the potential platforms.

OOB telemetry can include, by way of non-limiting example: number of NICs, vendor and model for each NIC, type of Peripheral Component Interconnect Express (PCIe) device for each NIC, number of lanes or ports for each NIC, packets per second, packet size, and other packet parameters, PCI Device ID for each port of each NIC, type and size of each port, etc. Regarding VMs, telemetry can include whether each NIC is eligible to be used by each VM, whether each NIC is to be dedicated or shared among VMs, etc. If the NIC is to be shared, telemetry can include whether the NIC is to be shared with sing root I/O virtualization (SR-IOV) or shared through a vSwitch. If shared through SR-IOV, OOB telemetry can include the number of configured virtual functions, a PCI Device ID for each VF, bandwidth or pacing for each VF, etc. If shared through vSwitch, OOB telemetry can include whether a corresponding vSwitch is in bridge mode or network address translation (NAT) mode, number of virtual interfaces, etc. OOB telemetry can include configurations of the supported and disabled functions, offloaded aspects of a NIC or switch function, offload or hardware acceleration policy per tenant, per flow, per SL owner, etc., offload errors, alarms, audits, etc. OOB telemetry can include bandwidth between non-uniform memory access (NUMA) nodes, including total bandwidth and used bandwidth. However, the OOB telemetry examples listed herein are not to be taken as limiting embodiments to any particular OOB telemetry.

OOB Platform Tuning, Configuration and Optimization

As briefly mentioned earlier herein, embodiments also provide for improved synchronization and accurate telemetry across servers within racks, across the datacenter, and across multiple datacenters spanning multiple geographical locations. Such synchronization is an issue in datacenter operations that inhibits synchronized delivery of cloud services, ensuring that the user always observes the latest copies of data. Embodiments provide improved tuning performance of platform and workloads and tracking that behavior over time and share resource reallocation to meet SLA targets.

Some synchronizations methods use in-band methods, which require OS/VMM involvement on each system involved. Embodiments provide an OOB approach, described herein.

Figure 6:
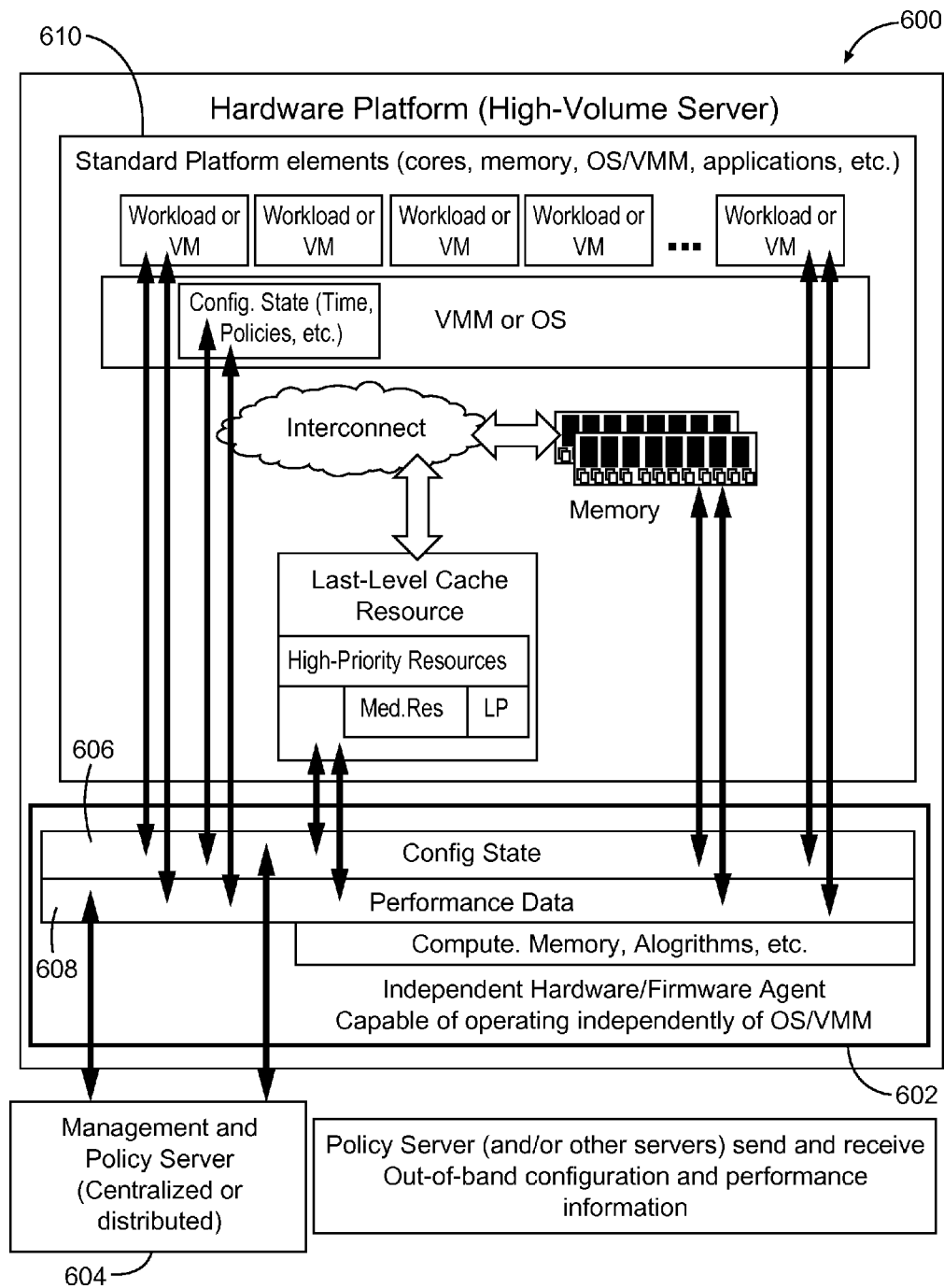
FIG. 6 is a block diagram of a system for out-of-band platform configuration parameter configurability in accordance with some embodiments.

FIG. 6 is a block diagram of a system 600 for OOB platform configuration parameter configurability in accordance with some embodiments.

As shown in FIG. 6, an independent hardware/firmware agent 602 communicates with a management and policy server 604 to send/receive information including configuration inputs 606 and performance feedback 608. This hardware/firmware agent 602 may communicate with the management and policy server 604 over a standard network link or over a specialized network with lower congestion to lower latency.

The hardware/firmware agent 602 may communicate with the rest of the platform 610 (shared resources, OS/VMM, application software, etc.) via other interfaces or protocols, which may include shared memory regions (mailbox-style approaches) or interrupts.

The hardware/firmware agent 602 may be implemented in Intel® IE (customer customizable) or Intel® ME (closed-source) although embodiments are not limited thereto. Components of the device 150 (FIG. 1) may also be included in the hardware/firmware agent 602.

Since the hardware/firmware agent 602 operates independently of the rest of the platform 600, the hardware/firmware agent 602 can asynchronously receive configuration inputs from the management and policy server 604 in the datacenter (which in turn may have received policy updates from another datacenter in a geographically different region). Accordingly, the hardware/firmware agent 602 can apply these updates to the platform 600 after processing, wherein processing includes configuration checking, merge, applicability filtering, parameter modification, etc. The hardware/firmware agent 602 may also communicate with many other platform elements 610 such as OS/VMM software, individual applications, performance monitoring counters, or shared resources such as the L3 cache and memory to measure sharing of such shared resources on a per-application basis. These metrics can then be provided back to the management and policy server 604 in order to guide advanced resource-aware scheduling decisions, to meet SLAs or other average performance targets, or to provide metrics to the datacenter administrator to measure metrics such as cache and memory contention and bandwidth utilization, aggregated or reported per-platform.

In addition to configuration changes, embodiments can provide platform optimizations, such as tuning prefetchers, in real time based on the workloads that are running, in order to provide higher performance. Such fine-grained tuning algorithms may be run either at the management and policy server 604 or at hardware/firmware agent 602 depending on datacenter goals and the level of logging and visibility required.

The asynchronous hardware/firmware agent 602 and its interfaces to the management and policy server 604 and the rest of the platform 600, including hardware and software, provide a set of OOB capabilities as described herein. The hardware/firmware agent 602 can include compute resources consisting of one or more cores, memory resources, telemetry data and other data, a configuration state passed down from the management and policy server 604, which may be modified locally before applying to the system, and performance data read back from the platform 600. Algorithms running in the hardware/firmware agent 602 or a core therein can act upon performance feedback data and node/workload mappings and policies (which may include performance targets) to determine whether performance targets are met. These algorithms may include simple policies to maximize a single variable (such as system throughput or the performance of a specific workload) or more complex (e.g., involving multiple platform inputs and multivariate parameter maximization or optimization schemes, or complex algorithms to compare performance of multiple workloads to individual performance targets). These algorithms can act upon input performance data to make reconfiguration decisions to provide to the reset of the platform 600. These reconfiguration changes may change the behavior of the platform 600, thereby modifying the performance metrics reported back to the hardware/firmware agent 602, thereby forming a closed-loop control system consisting of the hardware/firmware agent 602, the management and policy server 604, the performance feedback, and the rest of the platform. The management and policy server 604 can be centralized or distributed in various embodiments.

The management and policy server 604 can include a state table or similar tracking system that tracks per-node state of workloads, policies, cache sensitivity, bandwidth sensitivity and other pertinent workload sensitivity data and performance metrics.

The hardware/firmware agent 602 provides performance monitoring data to the management and policy server 604. The performance monitoring data may be sampled from a variety of sources, including application feedback, OS feedback, or hardware sources, such as performance monitoring counters and resource monitoring counters. The performance monitoring data can provide detailed information on L3 cache utilization, memory bandwidth utilization, I/O bandwidth utilization, etc. These sources of information can be cleaned and optionally averaged and/or compressed before sending to the management and policy server 604, which maintains this information by mapping node and workload to each of the parameters and running algorithms on top of this data to determine optimal configuration settings. The management and policy server 604 may maintain a table or database mapping workloads, nodes, and performance characteristics to aid decision making and tracking of application characteristics across time.

The management and policy server 604 can push changes of timing data or configuration state to each server, or to other datacenters. Examples may include using these OOB mechanisms for time synchronization or for pushing configuration changes to switch to a more power-efficient operating mode for some servers during low-load times. These updates may be pushed over a standard or dedicated network interface to each platform (depending on datacenter network topology).

Once the hardware/firmware agent 602 receives a configuration update request from management and policy server 604, the hardware/firmware agent 602 can perform basic checking (e.g., checking whether the requested value is within a safe range, whether the requested configuration parameter is supported on this platform, etc.). The hardware/firmware agent 602 either can buffer the change to apply at a preset time (the present time may be specified with the message) or the hardware/firmware agent can apply the request immediately or as immediately as technologically feasible given network conditions, etc.

The hardware/firmware agent 602 can update parameters such as prefetchers settings, data directed I/O (DDIO), RDT allocation settings, PQoS, C-state settings, P-state settings (e.g., SpeedStep), OS configuration settings, application configuration settings or other configuration parameters request by the management and policy server 604.

Figure 7:
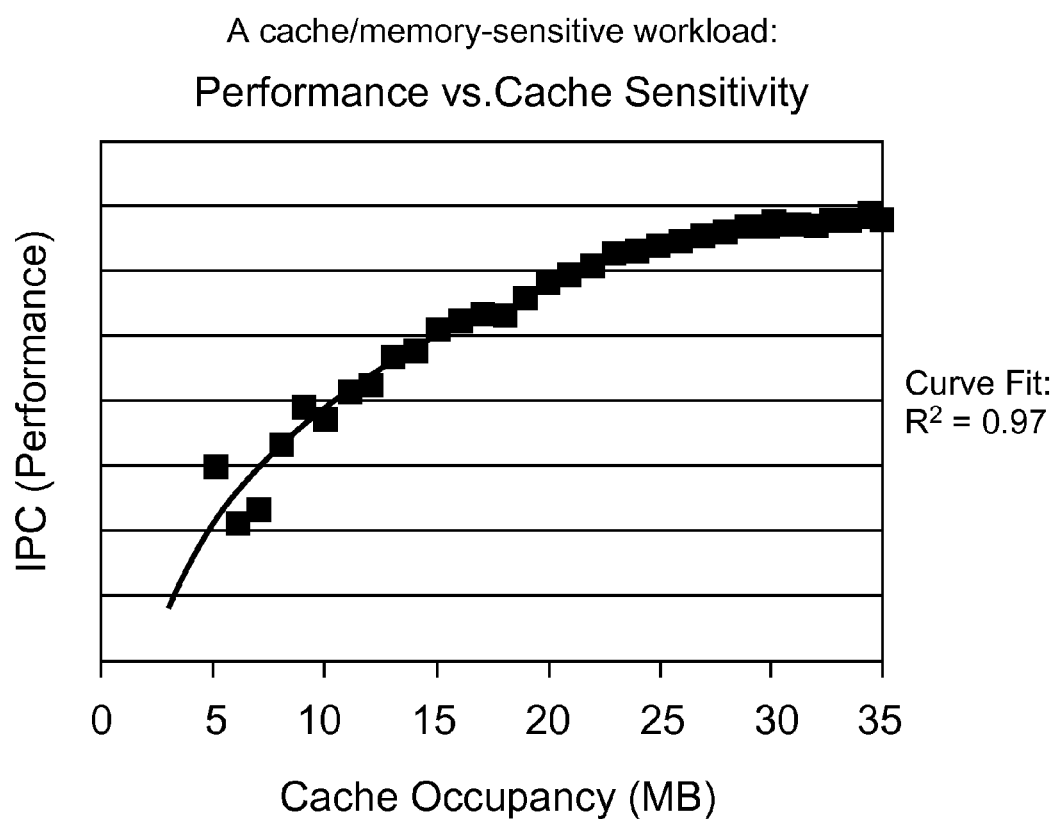
FIG. 7 illustrates performance versus cache occupancy of a cache-sensitive workload.
Figure 8:
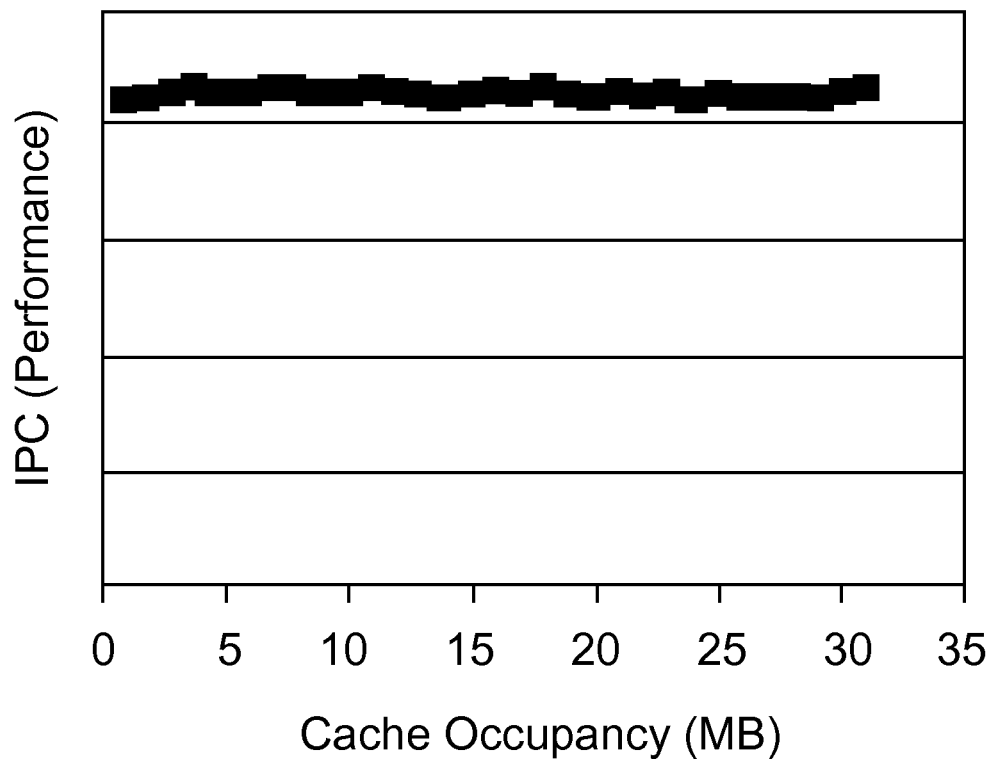
FIG. 8 illustrates performance versus cache sensitivity of a compute-bound workload that does not exhibit sensitivity to cache resources.

The hardware/firmware agent 602 may also independently run algorithms to tune system state, modulating the parameters previously listed or others. Performance aggregation algorithms, and an evaluation of the effectiveness thereof, is provided below with respect to FIGS. 7-8. FIG. 7 illustrates performance versus cache occupancy of a cache-sensitive workload. FIG. 8 illustrates performance versus cache sensitivity of a compute-bound workload that does not exhibit sensitivity to cache resources.

A plot similar to that shown in FIG. 7 can be generated by running a cache-sensitive application in the presence of many other applications including cache-intensive, compute-intensive, and memory-intensive applications, on the platform 600 (FIG. 6) or similar platform. FIG. 7 illustrates a detailed and accurate view of performance vs. cache occupancy (e.g., cache sensitivity). Embodiments can build such sensitivity curves to enable scheduling for single workloads on a server, as well as for all workloads in a datacenter simultaneously.

FIG. 8 illustrates another example plot as can be generated by running a compute-sensitive workload in the presence of many other applications including cache-intensive, compute-intensive, and memory-intensive applications, on the platform 600 (FIG. 6) or similar platform as can be seen in a typical datacenter. As will be appreciated, the compute-sensitive workload does not show sensitivity to shared resources such as last-level cache. Embodiments can detect and track such workloads at a fine-grained level in a dynamic datacenter.

Figure 9:
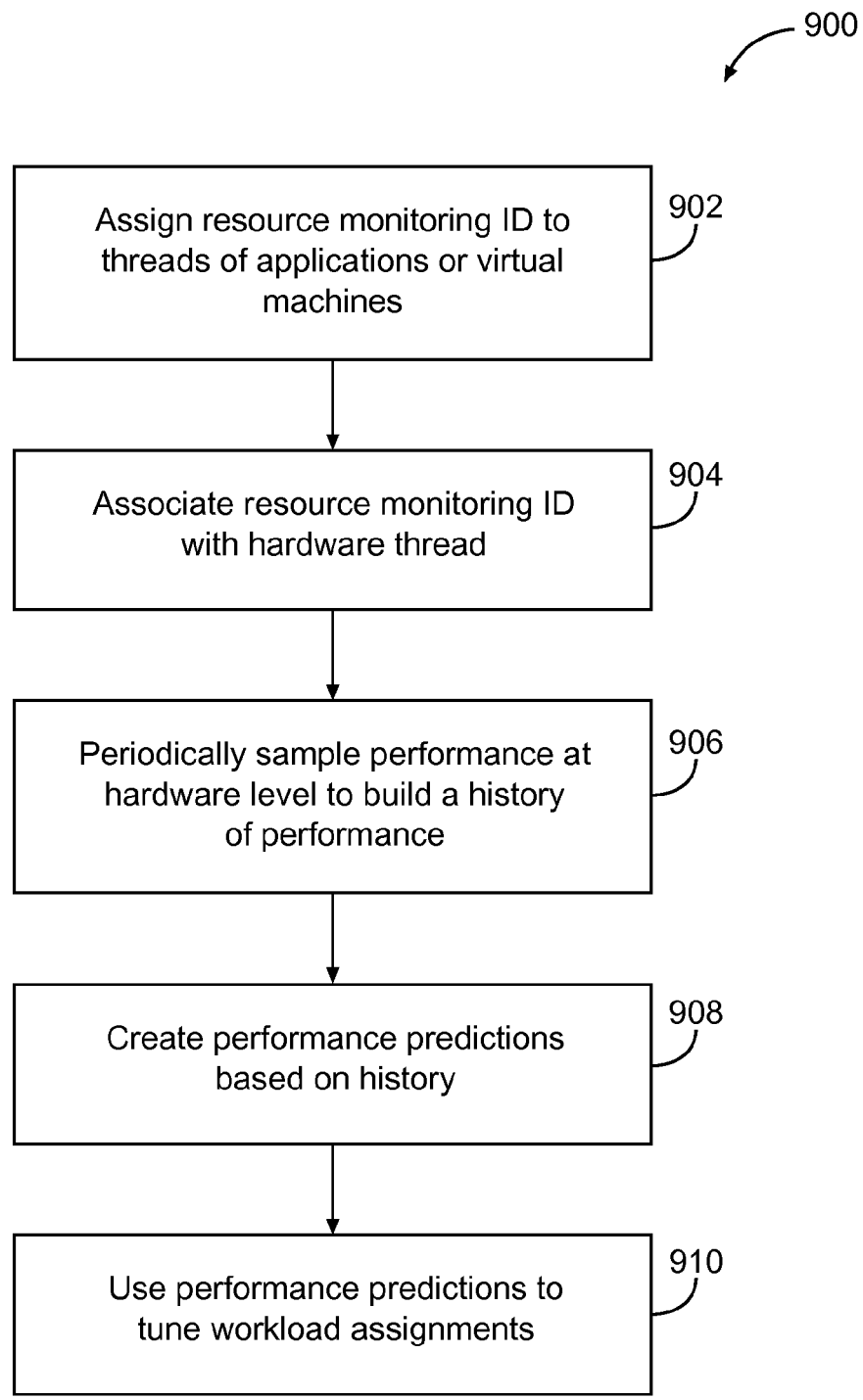
FIG. 9 is a flow diagram of an example hardware-implemented method for implementing a performance monitoring and aggregation algorithm in accordance with some embodiments.

FIG. 9 is a flow diagram of an example hardware-implemented method 900 for implementing a performance monitoring and aggregation algorithm in accordance with some embodiments. The device 150 (FIG. 1), the hardware/firmware agent 602, or another device or apparatus can perform one or more operations of example hardware-implemented method 900. According, the hardware/firmware agent 602 can execute performance monitoring aggregation algorithms in various embodiments to profile applications, as one part of a multi-faceted set of profiling algorithms.

The example method 900 begins with operation 902 with the hardware/firmware agent 602 assigning a resource monitoring identifier (RMID) to each thread of the application. The hardware/firmware agent 602 may use a technology such as Intel Cache Monitoring Technology (CMT) or Intel Memory Bandwidth Monitoring (MBM) in operation 902, although embodiments are not limited thereto.

The example method 900 continues with operation 904 with the hardware/firmware agent 602 associating an RMID with a hardware thread. In some embodiments, the hardware/firmware agent 602 may perform operation 904 on context swaps onto a core. In operation 904, therefore, software is instructing hardware to monitor the thread, which can be more computationally efficient relative to software thread monitoring. Software can later retrieve metrics such as instructions per cycle, etc.

The example method 900 continues with operation 906 with the hardware/firmware agent 602 periodically sampling the performance monitoring event codes for cache occupancy and memory bandwidth (via the IA32_QM_EVTSEL and IA32_QM_CTR MSR interfaces, for example), and sampling the performance of the application (via instructions per cycle (IPC), application-reported performance such as transactions per second, etc.).

The example method 900 continues with operation 908 with creation of performance predictions. In executing operation 908, the hardware/firmware agent 602 can store values retrieved in memory to build a history over time. After a period ranging from seconds to days, the hardware/firmware agent 602 can process the data by "bucketing" into categories of cache occupancy (e.g., 0-1 MB, 1-2 MB, 2-3 MB, etc. as buckets for cache occupancy) and average the performance values for each "bucket." The hardware/firmware agent 602 can fit a curve to the given points, creating a fit for memory bandwidth or cache occupancy vs. performance.

The hardware/firmware agent 602 or other system can check a correlation coefficient to confirm that the correlation coefficient is sufficiently high to provide usable and accurate performance predictions for cache occupancy or memory bandwidth inputs. The coefficients can be saved in tables described earlier herein with reference to FIG. 6 or in other memory.

The hardware/firmware agent 602 may take derivatives of the curves to create curves that model performance sensitivity vs. cache occupancy or performance bandwidth. The hardware/firmware agent 602 or other component of the platform 600 (FIG. 6) can use these models to make threshold-based decisions as to how much cache or memory bandwidth an application actually needs.

Figure 10:
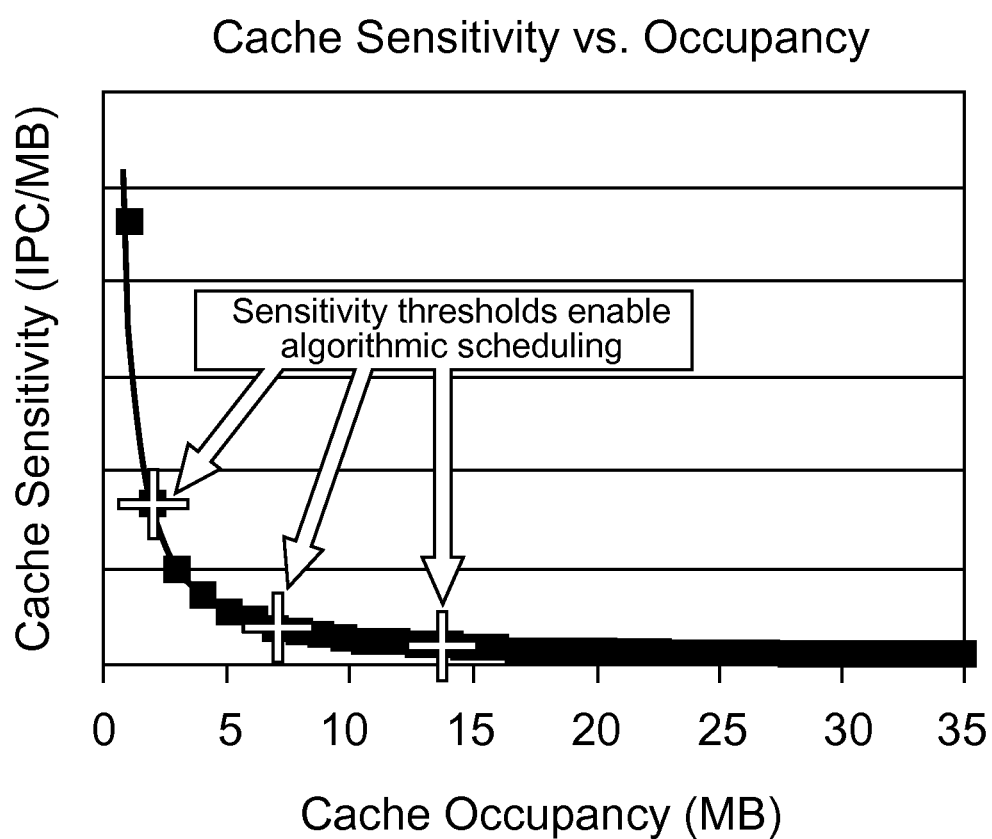
FIG. 10 illustrates cache sensitivity data for a cache-sensitive workload that can be analyzed for making configuration decisions in accordance with some embodiments.

For example, with reference to FIG. 10, the optimal cache operating point of an application can be defined as the point A where application performance improves less than 2% (or some other threshold amount or percentage) by providing an additional 1 MB of L3 cache). FIG. 10 illustrates cache sensitivity data for a cache-sensitive workload that can be analyzed for making configuration decisions in accordance with some embodiments. FIG. 10 was formed for a cache-sensitive workload, by taking the derivative of a curve fit to the original data. In embodiments, one or more components of the platform 600 or other component or computing system described herein, can include a display for displaying curves of FIG. 10, or any other curve produced in the course of providing analysis of cache sensitivity, cache operating points, etc.

Referring again to FIG. 9, any or all of the operations of example method 900 can be repeated periodically to either rebuild or augment the performance prediction curves on a per-app/thread/VM basis. Analyses such as those described above can allow advanced workload placement decisions to be made in real time. For instance if a workload is found to be cache-sensitive, and is specified to be high-priority by the datacenter administrator, that workload could be moved to a server with low cache utilization for better performance. Alternately, using systems and apparatuses in accordance with various embodiments, the central controller/datacenter manager could push an update to the server to force the system to reconfigure the caches to reserve a larger portion of the cache for this cache-sensitive workload. These types of updates are possible in real-time, without the need for the datacenter administrator to intervene thanks to the closed-loop software control provided in various embodiments.

Though the example embodiments described above are based on a datacenter environment, which may be running bare metal or virtualized workloads, OOB platform monitoring and configuration in accordance with various embodiments is applicable across multiple scenarios, including communication workloads, and NFV/SDN scenarios, where the priority of certain flows is updated in real-time with low latency, for instance.

The example method 900 can include any other operations or functionalities of a device 150, a hardware/firmware agent 602, or usage model thereof, described above with respect to FIGS. 1-8. Operations can be performed in any order or in parallel where appropriate. The method 900 can be performed by hardware, firmware, software, or any combination thereof.

For example, in some embodiments, the example method 900 can include processing circuitry 200 (FIG. 2) or other elements receiving a configuration state from a management and policy server 604, the configuration state including at least one processing core identifier and at least one of a workload, a policy, a cache sensitivity, and a bandwidth sensitivity for the respective at least one processing core identifier; providing performance feedback, to the management and policy server, for at least one processing core identified by the at least one processing core identifier; and receiving recommendations from the management and policy server for providing the reconfiguration message, based on the performance feedback. Upon receiving performance monitoring event codes corresponding to a parameter of interest, the processing circuitry 200 or other component can detect application performance to generate a performance curve relating application performance to the parameter of interest; generate a sensitivity curve, from the performance curve, to determine sensitivity of application performance to the parameter of interest; and provide the sensitivity curve as an input to an algorithm for generating reconfiguration decisions. The parameter of interest can include one of cache occupancy and memory bandwidth.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, at least a part of one or more computer systems (e.g., a standalone, client or server computer system) or one or more processors of the device 150 or the hardware/firmware agent 602 may be configured by firmware or software (e.g., instructions 202 (FIG. 2), an application portion, or an application) as a module that operates to perform specified operations. In an example, the software may reside on at least one machine-readable medium. In an example, the software, when executed by the underlying hardware of the module (e.g., the device 150 or the hardware/firmware agent 602), can include instructions 202 (FIG. 2) to cause the hardware to perform the specified operations.

For example, instructions 202 can cause hardware to receive periodically over a time duration, performance monitoring event codes related to at least one of memory bandwidth and cache occupancy for a computing platform. The instructions 202 can cause the hardware to periodically detect application performance for an application executing on the computing platform, responsive to periodically receiving the performance monitoring event codes, to generate at least one curve relating application performance to at least one of memory bandwidth and cache occupancy for the computing platform.

In various embodiments, the instructions 202 can cause the hardware to determine sensitivity of application performance to at least one of memory bandwidth and cache occupancy based on a first derivative of the at least one curve. The instructions 202 can cause the hardware to generate a configuration decision for the computing platform based on sensitivity of application performance to at least one of memory bandwidth and cache occupancy.

In some embodiments, the instructions 202 can cause the hardware to assign a resource monitoring identifier (RMID) to each thread of an application and analyzing one of instructions per cycle and transactions per second of application threads based on respective RMIDs.

The term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. The term "application," or variants thereof, is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the term application may be used to refer to an embodiment of software or to hardware arranged to perform at least part of any operation described herein.

While a machine-readable medium may include a single medium, the term "machine-readable medium" may include a single medium or multiple media (e.g., a centralized or distributed database, and/or associated caches and servers).

The term "machine-readable medium" may include any medium that is capable of storing, encoding, or carrying instructions 202 for execution by a machine (e.g., the device 150 or any other module) and that cause the machine to perform any one or more of the techniques of the present disclosure, or that is capable of storing, encoding or carrying data structures used by or associated with such instructions. In other words, the processing circuitry 200 (FIG. 2) can include instructions and can therefore be termed a machine-readable medium in the context of various embodiments. Other non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 202 may further be transmitted or received over a communications network using a transmission medium utilizing any one of a number of transfer protocols (e.g., frame relay, internet protocol (IP), TCP, user datagram protocol (UDP), hypertext transfer protocol (HTTP), etc.). Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1x* standards and Long Term Evolution (LTE)), Plain Old Telephone (POTS) networks, and wireless data networks (e.g., Institute of Electrical and Electronics Engineers (IEEE) 802 family of standards including IEEE 802.11 standards (WiFi), IEEE 802.16 standards (WiMax®) and others), peer-to-peer (P2P) networks, or other protocols now known or later developed.

The term "transmission medium" shall be taken to include any intangible medium that is capable of storing, encoding or carrying instructions for execution by hardware processing circuitry, and includes digital or analog communications signals or other intangible medium to facilitate communication of such software.

ADDITIONAL NOTES & EXAMPLES

Example 1 includes subject matter (such as a control device, interplane control device, control plane processor, computer device and or any other electrical apparatus, device or processor) including at least one telemetry interface to a telemetry collection system; at least one network interface to network adapter hardware; and processing circuitry configured to receive platform telemetry metrics from the telemetry collection system, and network adapter silicon hardware statistics over the at least one network interface, to gather collected statistics, apply a heuristic algorithm using the collected statistics to determine processing core workloads generated by operation of a plurality of software systems communicatively coupled to the device, and provide a reconfiguration message to instruct at least one software system to switch operations to a different processing core, responsive to detecting an overload state on at least one processing core, based on the processing core workloads.

In Example 2, the subject matter of Example 1 can optionally include wherein the plurality of software systems includes at least one virtual machine (VM).

In Example 3, the subject matter of any of Examples 1-2 can optionally include wherein the processing circuitry is configured to provide the reconfiguration message within a request to a hypervisor.

In Example 4, the subject matter of any of Examples 1-3 can optionally include wherein the platform telemetry metrics include metrics of at least two metric types selected from a group including processing core data, chipset data, memory element performance data, data received from an encryption unit, data received from a compression unit, storage data, virtual switch (vSwitch) data, and data received over a network interface card (NIC) connection, wherein data received over the NIC includes NIC telemetry, wherein NIC telemetry includes at least one of an indication of packets per second received at the NIC and average packet size received at the NIC.

In Example 5, the subject matter of any of Examples 1-4 can optionally include at least one platform interface to a platform metrics collection system, and wherein the processing circuitry is further configured to gather platform quality of service (PQoS) metrics over the at least one platform interface, and to use the PQoS metrics as inputs to the heuristic algorithm.

In Example 6, the subject matter of any of Examples 1-5 can optionally include wherein the processing circuitry is further configured to instruct a set of at least two processing cores, in sequence, to enter an offline state; provide instructions for performing tests on each of the set of at least two processing cores after a respective one of the set of at least two processing cores has entered the offline state; and rank the set of at least two processing cores based on performance during the tests, subsequent to performing tests, to generate a ranked set of processing cores.

In Example 7, the subject matter of Example 6 can optionally include wherein the tests include evaluations of at least one of core-to-cache bandwidth, core-to-memory bandwidth, and core-to-I/O bandwidth.

In Example 8, the subject matter of any of Examples 6-7 can optionally include wherein the processing circuitry is further configured to provide instructions for steering incoming NIC traffic to a processing core of the ranked set of processing cores, based on priority level of the incoming NIC traffic.

In Example 9, the subject matter of any of Examples 1-8 can optionally include herein the processing circuitry is further arranged to determine, based on the heuristic algorithm, whether service level agreement (SLA) criteria have been met; and report SLA violations to datacenter management software if SLA criteria have not been met.

In Example 10, the subject matter of any of Examples 1-9 can optionally include wherein the processing circuitry is further arranged to receive a configuration state from a management and policy server, the configuration state including at least one processing core identifier and at least one of a workload, a policy, a cache sensitivity, and a bandwidth sensitivity for the respective at least one processing core identifier; provide performance feedback, to the management and policy server, for at least one processing core identified by the at least one processing core identifier; and receive recommendations from the management and policy server for providing the reconfiguration message, based on the performance feedback.

In Example 11, the subject matter of Example 10 can optionally include wherein the processing circuitry is further arranged to upon receiving performance monitoring event codes corresponding to a parameter of interest, detect application performance to generate a performance curve relating application performance to the parameter of interest; generate a sensitivity curve, from the performance curve, to determine sensitivity of application performance to the parameter of interest; and provide the sensitivity curve as an input to an algorithm for generating reconfiguration decisions.

In Example 12, the subject matter of Example 11 can optionally include wherein the parameter of interest includes one of cache occupancy and memory bandwidth, and wherein cache occupancy is independent of memory bandwidth.

Example 13 includes subject matter such as a machine-readable medium including instructions that, when executed on a machine (such as a control device, interplane control device, Innovation Engine, Management Engine, control plane processor, computing device, NIC card, etc.) cause the machine to receive, periodically over a time duration, performance monitoring event codes related to at least one of memory bandwidth and cache occupancy for a computing platform; periodically detect application performance for an application executing on the computing platform, responsive to periodically receiving the performance monitoring event codes, to generate at least one curve relating application performance to at least one of memory bandwidth and cache occupancy for the computing platform; determine sensitivity of application performance to at least one of memory bandwidth and cache occupancy based on a first derivative of the at least one curve; and generate a configuration decision for the computing platform based on sensitivity of application performance to at least one of memory bandwidth and cache occupancy.

In Example 14, the subject matter of Example 13 can optionally include further instructions to cause the machine to assign a resource monitoring identifier (RMID) to each thread of the application; and analyze one of instructions per cycle and transactions per second of application threads based on respective RMIDs.

In Example 15, the subject matter of Example 14 can optionally include further instructions to cause the machine to generate a cache operating point for the application by determining a point, based on application sensitivity curve, at which application performance is improved by less than a threshold amount for an additional unit measurement of cache; and provide a configuration decision to specify that the application should execute on a processing core with low cache utilization if the cache operating point indicates that the application has a high level of cache sensitivity.

In Example 16, the subject matter of Example 15 can optionally include further instructions to cause the machine to provide the at least one curve relating application performance to at least one of memory bandwidth and cache occupancy for display on a central management engine.

Example 17 includes subject matter include a method, the method comprising receiving platform telemetry metrics from a telemetry collection system, and network adapter silicon hardware statistics over at least one network interface, to gather collected statistics; applying a heuristic algorithm using the collected statistics to determine processing core workloads generated by operation of a plurality of virtual machines (VMs) communicatively coupled to the device; and providing a reconfiguration message to a hypervisor to instruct at least one VM associated with the hypervisor to switch operations to a different processing core, responsive to detecting an overload state on at least one processing core, based on the processing core workloads.

In Example 18, the subject matter of Example 17 can optionally include wherein the platform telemetry metrics include metrics of at least two metric types selected from a group including processing core data, chipset data, memory element performance data, data received from an encryption unit, data received from a compression unit, storage data, virtual switch (vSwitch) data, and data received over a network interface card (NIC) connection.

In Example 19, the subject matter of any of Examples 17-18 can optionally include instructing a set of at least two processing cores to enter, in sequence, an offline state; providing instructions for performing tests on each of the set of at least two processing cores after a respective one of the set of at least two processing cores has entered the offline state; ranking the set of at least two processing cores based on performance during the tests, subsequent to performing tests, to generate a ranked set of processing cores; and providing instructions for steering incoming network interface card (NIC) traffic to a processing core of the ranked set of processing cores, based on priority level of the incoming NIC traffic.

In Example 20, the subject matter of Example 19 can optionally include herein the tests include evaluations of at least one of core-to-cache bandwidth, core-to-memory bandwidth, and core-to-input/output bandwidth.

In Example 21, the subject matter of any of Examples 17-20 can optionally include receiving, periodically over a time duration, performance monitoring event codes related to at least one of memory bandwidth and cache occupancy for a computing platform that includes the processing cores; periodically detecting application performance for an application executing on the computing platform, responsive to periodically receiving the performance monitoring event codes, to generate at least one curve relating application performance to at least one of memory bandwidth and cache occupancy for the computing platform; determining sensitivity of application performance to at least one of memory bandwidth and cache occupancy based on a first derivative of the at least one curve; and generating a configuration decision for the computing platform based on sensitivity of application performance to at least one of memory bandwidth and cache occupancy.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An orchestration controller device for a computer system having a multi-core computing platform architecture and a plurality of network adapters, the multi-core computing platform architecture and network adapters to provide resources for facilitating in-band data flow for at least one software system, the device comprising:
    at least one telemetry interface to a telemetry collection system, the telemetry collection system to collect platform telemetry metrics via out-of-band (OOB) access to processing cores of the multi-core computing platform, the platform telemetry metrics including processing core workloads;
    at least one network hardware interface to network adapter hardware of the network adaptors, the at least one network hardware interface to collect network adapter silicon hardware statistics via OOB access to the network adapters;

wherein the OOB access to processing cores and to the network adapters avoids utilizing the resources for facilitating the in-band data flow: and processing circuitry configured to:

receive the platform telemetry metrics from the telemetry collection system, and receive the network adapter silicon hardware statistics over the at least one network hardware interface, to gather collected statistics, apply a heuristic algorithm using the collected statistics to determine processing core workloads generated by operation of a plurality of software systems communicatively coupled to the device, and provide a reconfiguration message to instruct the at least one software system to switch operations to a different processing core, responsive to detecting an overload state on at least one of the processing cores, based on the processing core workloads.

2. The device of claim 1, wherein the plurality of software systems includes at least one virtual machine (VM).

3. The device of claim 1, wherein the processing circuitry is configured to provide the reconfiguration message within a request to a hypervisor.

4. The device of claim 1, wherein the platform telemetry metrics include metrics of at least two metric types selected from a group including processing core data, chipset data, memory element performance data, data received from an encryption unit, data received from a compression unit, storage data, virtual switch (vSwitch) data, and data received over a network interface card (NIC) connection of a NIC, wherein data received over the NIC connection includes NIC telemetry, wherein NIC telemetry includes at least one of an indication of packets per second received at the NIC and average packet size received at the NIC.

5. The device of claim 1, further comprising:
at least one platform interface to a platform metrics collection system, and wherein the processing circuitry is further configured to gather platform quality of service (PQoS) metrics over the at least one platform interface, and to use the PQoS metrics as inputs to the heuristic algorithm.

6. The device of claim 1, wherein the processing circuitry is further configured to:
instruct a set of at least two processing cores, in sequence, to enter an offline state;
provide instructions for performing tests on each of the set of at least two processing cores after a respective one of the set of at least two processing cores has entered the offline state; and
rank the set of at least two processing cores based on performance during the tests, subsequent to performing tests, to generate a ranked set of processing cores.

7. The device of claim 6, wherein the tests include evaluations of at least one of:
core-to-cache bandwidth,
core-to-memory bandwidth, and
core-to-I/O bandwidth.

8. The device of claim 7, wherein the processing circuitry is further configured to:
provide instructions for steering incoming NIC traffic to a processing core of the ranked set of processing cores, based on priority level of the incoming NIC traffic.

9. The device of claim 1, wherein the processing circuitry is further arranged to:

determine, based on the heuristic algorithm, whether service level agreement (SLA) criteria have been met; and report SLA violations to datacenter management software if SLA criteria have not been met.

10. The device of claim 1, wherein the processing circuitry is further arranged to:
receive a configuration state from a management and policy server, the configuration state including at least one processing core identifier and at least one of a workload, a policy, a cache sensitivity, and a bandwidth sensitivity for the respective at least one processing core identifier;
provide performance feedback, to the management and policy server, for at least one processing core identified by the at least one processing core identifier; and
receive recommendations from the management and policy server for providing the reconfiguration message, based on the performance feedback.

11. The device of claim 10, wherein the processing circuitry is further arranged to:
upon receiving performance monitoring event codes corresponding to a parameter of interest, detect application performance to generate a performance curve relating application performance to the parameter of interest;
generate a sensitivity curve, from the performance curve, to determine sensitivity of application performance to the parameter of interest; and
provide the sensitivity curve as an input to an algorithm for generating reconfiguration decisions.

12. The device of claim 11, wherein the parameter of interest includes one of cache occupancy and memory bandwidth, and wherein cache occupancy is independent of memory bandwidth.

13. A method for platform processing core configuration of a computer system having a multi-core computing platform architecture, and a plurality of network adapters, the multi-core computing platform architecture and network adapters facilitating in-band data flow for a plurality of virtual machines (VMs) and a hypervisor hosted on the computer system, the method comprising:
receiving platform telemetry metrics from a telemetry collection system, the telemetry collection system collecting platform telemetry metrics via out-of-band (DOB) access to processing cores of the multi-core computing platform, the platform telemetry metrics including processing core workloads, wherein the OOB access avoids utilizing the resources for facilitating the in-band data flow;
collecting network adapter silicon hardware statistics over at least one network hardware interface, via OOB access to the network adapters, to gather collected statistics;
applying a heuristic algorithm using the collected statistics to determine processing core workloads generated by operation of the plurality of VMs; and
providing a reconfiguration message to the hypervisor to instruct at least one of the VMs associated with the hypervisor to switch operations to a different processing core, responsive to detecting an overload state on at least one of the processing cores, based on the processing core workloads.

14. The method of claim 13, wherein the platform telemetry metrics include metrics of at least two metric types selected from a group including processing core data, chipset data, memory element performance data, data received from an encryption unit, data received from a compression unit, storage data, virtual switch (vSwitch) data, and data received over a network interface card (NIC) connection.

15. The method of claim 13, further comprising:
instructing a set of at least two processing cores to enter, in sequence, an offline state; providing instructions for performing tests on each of the set of at least two processing cores after a respective one of the set of at least two processing cores has entered the offline state;
ranking the set of at least two processing cores based on performance during the tests, subsequent to performing tests, to generate a ranked set of processing cores; and
providing instructions for steering incoming network interface card (NIC) traffic to a processing core of the ranked set of processing cores, based on priority level of the incoming NIC traffic.

16. The method of claim 15, wherein the tests include evaluations of at least one of:
core-to-cache bandwidth,
core-to-memory bandwidth, and
core-to-input/output bandwidth.

17. The method of claim 13, further comprising:
receiving, periodically over a time duration, performance monitoring event codes related to at least one of memory bandwidth and cache occupancy for the multi-core computing platform;
periodically detecting application performance for an application executing on the multi-core computing platform, responsive to periodically receiving the performance monitoring event codes, to generate at least one curve relating application performance to at least one of memory bandwidth and cache occupancy for the multi-core computing platform;
determining sensitivity of application performance to at least one of memory bandwidth and cache occupancy based on a first derivative of the at least one curve; and
generating a configuration decision for the multi-core computing platform based on sensitivity of application performance to at least one of memory bandwidth and cache occupancy.

\* \* \* \* \*

UNITED STATES PATENT AND TRADEMARK OFFICE
CERTIFICATE OF CORRECTION

PATENT NO. : 9,942,631 B2  
APPLICATION NO. : 14/866567  
DATED : April 10, 2018  
INVENTOR(S) : Herdrich et al.

Page 1 of 1

It is certified that error appears in the above-identified patent and that said Letters Patent is hereby corrected as shown below:

In the Claims

In Column 19, Line 6, in Claim 1, delete "flow: and" and insert --flow; and¶-- therefor In Column 21, Line 5, in Claim 15, after "state;", insert --¶--

Signed and Sealed this  
Twenty-first Day of April, 2020

Andrei Iancu  
*Director of the United States Patent and Trademark Office*